US012745267B2

(12) United States Patent
Liu et al.

(10) Patent No.: US 12,745,267 B2
(45) Date of Patent: Sep. 22, 2026

(54) MINI-SLOT CHANNEL ACCESS FOR A SIDELINK USER EQUIPMENT (UE)

(71) Applicant: QUALCOMM Incorporated, San Diego, CA (US)

(72) Inventors: Chih-Hao Liu, San Diego, CA (US); Jae Ho Ryu, San Diego, CA (US); Giovanni Chisci, San Diego, CA (US); Hobin Kim, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 605 days.

(21) Appl. No.: 18/448,096

(22) Filed: Aug. 10, 2023

(65) Prior Publication Data

US 2024/0057126 A1 Feb. 15, 2024

Related U.S. Application Data

(60) Provisional application No. 63/397,314, filed on Aug. 11, 2022.

(51) Int. Cl.
*H04W 72/25* (2023.01)
*H04W 74/0808* (2024.01)

(52) U.S. Cl.
CPC ....... *H04W 72/25* (2023.01); *H04W 74/0808* (2013.01)

(58) Field of Classification Search
CPC ... H04L 5/0044; H04L 5/0048; H04L 5/0051; H04L 5/0053; H04W 72/02;
(Continued)

(56) References Cited

U.S. PATENT DOCUMENTS 11,800,380 B1 * 10/2023 Sung .................. H04L 27/2602
2015/0063280 A1 * 3/2015 Nan ...................... H04L 1/0058
370/329

(Continued)

OTHER PUBLICATIONS

Fujitsu: "Initial Slot with Flexible Starting Positions for NR-U", 3GPP TSG RAN WG1 Meeting #9, R1-1812403 Initial Slot V1.0, 3rd Generation Partnership Project, Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 2, 2018, pp. 1-4, XP051478603, Paragraph [0002].

(Continued)

*Primary Examiner* — Dung B Huynh
(74) *Attorney, Agent, or Firm* — Seyfarth Shaw LLP

(57) ABSTRACT

A method for wireless communication at a first sidelink user equipment (UE) includes performing, in a shared radio frequency band, a listen-before-talk (LBT) for a channel occupancy time (COT). The method also includes selecting a full-slot sidelink channel waveform hypothesis associated with a first starting symbol, or a half-slot sidelink channel waveform hypothesis associated with a second starting symbol, in accordance with a timing associated with clearing the LBT. The method further includes transmitting, during the COT, sidelink information to a second sidelink UE, a transport block size (TBS) associated with the COT having a fixed number of resources, the fixed number of resources being a same number of resources for full-slot sidelink channel waveform hypothesis and the half-slot sidelink channel waveform hypothesis.

22 Claims, 9 Drawing Sheets

(58) Field of Classification Search
CPC . H04W 72/0446; H04W 72/25; H04W 72/40; H04W 74/0808; H04W 92/18
See application file for complete search history.

(56) References Cited

U.S. PATENT DOCUMENTS

2017/0201982 A1* 7/2017 Rico Alvarino ........ H04L 5/003
2018/0049233 A1* 2/2018 Luo ........................ H04W 72/23
2018/0063865 A1* 3/2018 Islam ..................... H04L 5/0064
2018/0249499 A1* 8/2018 Kim .................. H04W 72/0446
2018/0287840 A1* 10/2018 Akkarakaran ........ H04L 27/262
2019/0364592 A1* 11/2019 Bhattad ................. H04L 1/1896
2020/0029318 A1* 1/2020 Guo ...................... H04W 72/23
2020/0106655 A1* 4/2020 Gulati ................. H04L 27/2607
2020/0137779 A1* 4/2020 Sun ....................... H04L 5/0032
2020/0137823 A1* 4/2020 Nam ................. H04W 52/0229
2020/0236710 A1* 7/2020 Sun ....................... H04L 5/0016
2020/0267730 A1* 8/2020 Kim .................. H04W 72/0453
2020/0314842 A1* 10/2020 Bhattad ..................... H04L 1/08
2020/0351923 A1* 11/2020 Karaki .................. H04W 72/23
2020/0383095 A1* 12/2020 Moon ..................... H04L 5/001
2020/0403724 A1* 12/2020 Fujishiro ............... H04L 1/0015
2021/0051702 A1* 2/2021 Bhattad ................. H04L 1/1664
2021/0068149 A1* 3/2021 Bhattad ............. H04W 72/0446
2021/0175954 A1* 6/2021 Akkarakaran .......... H04W 8/24
2021/0194652 A1* 6/2021 Khoryaev ................. H04L 5/06
2021/0297221 A1* 9/2021 Lee ....................... H04L 1/1812
2021/0391894 A1* 12/2021 Yu ............................ H04B 7/01
2022/0060305 A1* 2/2022 Ijaz ......................... H04L 5/001
2022/0174735 A1* 6/2022 Li ..................... H04W 74/0816
2022/0182189 A1* 6/2022 Huang .................. H04L 1/1896
2022/0322415 A1* 10/2022 Wu ....................... H04L 5/0033
2023/0345429 A1* 10/2023 Liu ..................... H04W 72/541
2023/0345527 A1* 10/2023 Li ..................... H04W 74/0808
2023/0397187 A1* 12/2023 Elshafie ................ H04W 72/02
2024/0014976 A1* 1/2024 Hamidi-Sepehr ..... H04L 5/0051
2024/0040567 A1* 2/2024 Liu ..................... H04W 72/044
2024/0057126 A1* 2/2024 Liu ....................... H04W 72/02
2024/0080842 A1* 3/2024 Elshafie .............. H04L 27/2636
2024/0107586 A1* 3/2024 Mu ................... H04W 74/0833
2024/0114510 A1* 4/2024 Ryu ...................... H04L 5/0039
2024/0381426 A1* 11/2024 Liu ................... H04W 74/0808
2025/0004090 A1* 1/2025 Hasegawa ............ H04B 17/364
2025/0007592 A1* 1/2025 He ........................ H04L 1/0061
2025/0056600 A1* 2/2025 Selvanesan ........... H04W 28/18
2025/0081233 A1* 3/2025 Wang .................. H04W 74/002
2025/0142595 A1* 5/2025 Deng .................. H04L 27/2607
2025/0184984 A1* 6/2025 Yi ..................... H04W 72/0453
2025/0247826 A1* 7/2025 Liu ....................... H04W 72/02
2025/0247884 A1* 7/2025 Kusashima ....... H04W 74/0808
2025/0280426 A1* 9/2025 Lee ........................... H04L 1/18
2025/0280429 A1* 9/2025 Lee ....................... H04L 1/1822
2025/0331020 A1* 10/2025 Liu ................... H04W 74/0808
2025/0338300 A1* 10/2025 Wang .................... H04W 72/40
2025/0386368 A1* 12/2025 Chisci ............... H04W 74/0808
2026/0032702 A1* 1/2026 Rastegardoost ........ H04L 5/001
2026/0046926 A1* 2/2026 Hoang .................. H04W 72/40

OTHER PUBLICATIONS

Partial International Search Report—PCT/US2023/030090—ISA/EPO—Nov. 30, 2023.

Qualcomm Incorporated: "Physical Channel Design for Sidelink on Unlicensed Spectrum", 3GPP TSG-RAN WG1 #109-e, R1-2205034, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, XP052144140, 14 Pages, p. 2, Section 2.1.1-p. 3, Section 2.1.1.2, Section 2.1.2, Section 2, Paragraph [2.1.2].

International Search Report and Written Opinion—PCT/US2023/030090—ISA/EPO—Jan. 23, 2024.

* cited by examiner

MINI-SLOT CHANNEL ACCESS FOR A SIDELINK USER EQUIPMENT (UE)

CROSS-REFERENCE TO RELATED APPLICATION

The present application claims the benefit of U.S. Provisional Patent Application No. 63/397,314, filed on Aug. 11, 2022, and titled "MINI-SLOT CHANNEL ACCESS FOR A SIDELINK USER EQUIPMENT (UE)," the disclosure of which is expressly incorporated by reference in its entirety.

TECHNICAL FIELD

This application relates to wireless communication systems, and more particularly to resource reservation for sidelink communication over a shared radio frequency band.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

SUMMARY

In some aspects of the present disclosure, a method for wireless communication by a first sidelink user equipment (UE) includes performing, in a shared radio frequency band, a listen-before-talk (LBT) for a channel occupancy time (COT). The method also includes selecting a full-slot sidelink channel waveform hypothesis associated with a first starting symbol, or a half-slot sidelink channel waveform hypothesis associated with a second starting symbol, in accordance with a timing associated with clearing the LBT. The method further includes transmitting, during the COT, sidelink information to a second sidelink UE, a transport block size (TBS) associated with the COT having a fixed number of resources, the fixed number of resources being a same number of resources for full-slot sidelink channel waveform hypothesis and the half-slot sidelink channel waveform hypothesis.

Another aspects of the present disclosure are directed to an apparatus including means for performing, in a shared radio frequency band, an LBT for a COT. The apparatus also includes means for selecting a full-slot sidelink channel waveform hypothesis associated with a first starting symbol, or a half-slot sidelink channel waveform hypothesis associated with a second starting symbol, in accordance with a timing associated with clearing the LBT. The apparatus further includes means for transmitting, during the COT, sidelink information to a second sidelink UE, a TBS associated with the COT having a fixed number of resources, the fixed number of resources being a same number of resources for full-slot sidelink channel waveform hypothesis and the half-slot sidelink channel waveform hypothesis.

In other aspects of the present disclosure, a non-transitory computer-readable medium with non-transitory program code recorded thereon is disclosed. The program code is executed by a processor and includes program code to perform, in a shared radio frequency band, an LBT for a COT. The program code still further includes program code to select a full-slot sidelink channel waveform hypothesis associated with a first starting symbol, or a half-slot sidelink channel waveform hypothesis associated with a second starting symbol, in accordance with a timing associated with clearing the LBT. The program code also includes program code to transmit, during the COT, sidelink information to a second sidelink UE, a TBS associated with the COT having a fixed number of resources, the fixed number of resources being a same number of resources for full-slot sidelink channel waveform hypothesis and the half-slot sidelink channel waveform hypothesis.

Other aspects of the present disclosure are directed to a first sidelink user UE including one or more memories comprising processor-executable instructions; and one or more processors configured to execute the processor-executable instructions and cause the first sidelink UE to perform, in a shared radio frequency band, an LBT for a COT. The one or more processors are also configured to execute the processor-executable instructions and cause the first sidelink UE to select a full-slot sidelink channel waveform hypothesis associated with a first starting symbol, or a half-slot sidelink channel waveform hypothesis associated with a second starting symbol, in accordance with a timing associated with clearing the LBT. The one or more processors are further configured to execute the processor-executable instructions and cause the first sidelink UE to transmit, during the COT, sidelink information to a second sidelink UE, a TBS associated with the COT having a fixed number of resources, the fixed number of resources being a same number of resources for full-slot sidelink channel waveform hypothesis and the half-slot sidelink channel waveform hypothesis.

In some aspects of the present disclosure, a method for wireless communication by a first sidelink UE includes monitoring a first physical sidelink control channel (PSCCH) candidate location and a second PSCCH candidate location within each COT slot of a group of COT slots, the first PSCCH candidate location occurring prior to the second PSCCH candidate location within each COT slot of the group of COT slots. The method also includes receiving, from a second sidelink UE, a message in a first COT slot of the group of COT slots. The method also includes suspending the monitoring of the second PSCCH candidate location in at least the first COT slot based on the message triggering a suspension condition. The method further includes monitoring the first PSCCH candidate location within each COT slot, of the group of COT slots, after the first COT slot based on suspending the monitoring of the second PSCCH candidate location.

Other aspects of the present disclosure are directed to an apparatus including means for monitoring a first physical sidelink control channel (PSCCH) candidate location and a second PSCCH candidate location within each COT slot of a group of COT slots, the first PSCCH candidate location occurring prior to the second PSCCH candidate location within each COT slot of the group of COT slots. The apparatus also includes means for receiving, from a second sidelink UE, a message in a first COT slot of the group of COT slots. The apparatus further includes means for suspending the monitoring of the second PSCCH candidate location in at least the first COT slot based on the message triggering a suspension condition. The apparatus further includes means for monitoring the first PSCCH candidate location within each COT slot, of the group of COT slots, after the first COT slot based on suspending the monitoring of the second PSCCH candidate location.

In other aspects of the present disclosure, a non-transitory computer-readable medium with non-transitory program code recorded thereon is disclosed. The program code is executed by a processor and includes program code to monitor a first physical sidelink control channel (PSCCH) candidate location and a second PSCCH candidate location within each COT slot of a group of COT slots, the first PSCCH candidate location occurring prior to the second PSCCH candidate location within each COT slot of the group of COT slots. The program code also includes program code to receive, from a second sidelink UE, a message in a first COT slot of the group of COT slots. The program code also includes program code to suspend the monitoring of the second PSCCH candidate location in at least the first COT slot based on the message triggering a suspension condition. The program code further includes program code to monitor the first PSCCH candidate location within each COT slot, of the group of COT slots, after the first COT slot based on suspending the monitoring of the second PSCCH candidate location.

Other aspects of the present disclosure are directed to a first sidelink user UE including one or more memories comprising processor-executable instructions; and one or more processors configured to execute the processor-executable instructions and cause the first sidelink UE to monitor a first physical sidelink control channel (PSCCH) candidate location and a second PSCCH candidate location within each COT slot of a group of COT slots, the first PSCCH candidate location occurring prior to the second PSCCH candidate location within each COT slot of the group of COT slots. The one or more processors are also configured to execute the processor-executable instructions and cause the first sidelink UE to receive, from a second sidelink UE, a message in a first COT slot of the group of COT slots. The one or more processors are further configured to execute the processor-executable instructions and cause the first sidelink UE to suspend the monitoring of the second PSCCH candidate location in at least the first COT slot based on the message triggering a suspension condition. The apparatus further includes means for monitor the first PSCCH candidate location within each COT slot, of the group of COT slots, after the first COT slot based on suspending the monitoring of the second PSCCH candidate location.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
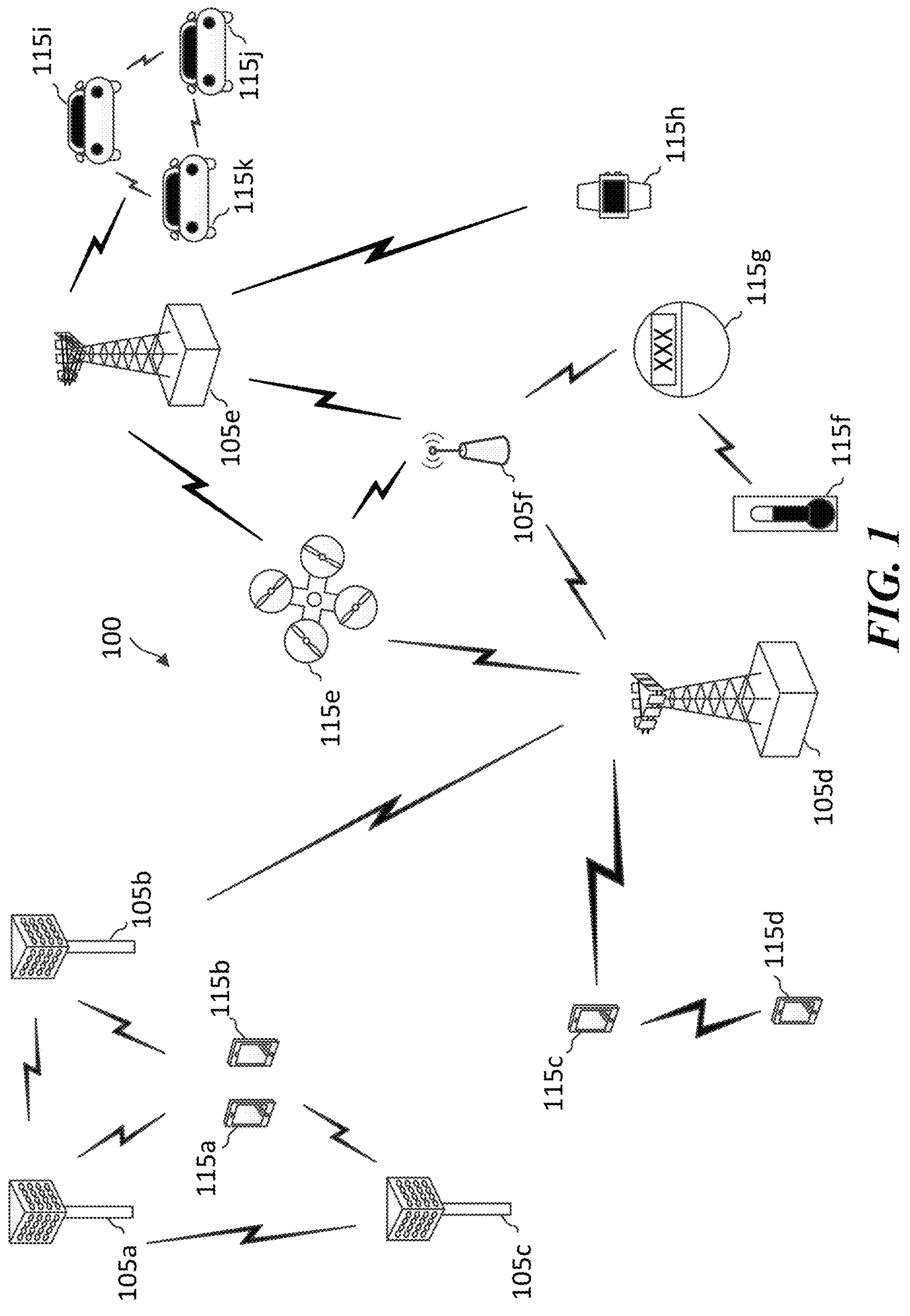
FIG. 1 illustrates a wireless communication network, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved universal terrestrial radio access (UTRA) (E-UTRA), Institute of Electrical and Electronics Engineers (IEEE) 802.11, IEEE 802.16, IEEE 802.20, flash-OFDM, and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project, which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. A sidelink UE may operate as a transmitting sidelink UE at one time and as a receiving sidelink UE at another time.

In some instances, a base station may configure a set of resources for use in sidelink communications between UEs. For example, the base station may configure frame and slot timing, which may be used for UEs in sidelink communications. In some cases, the configured resources for sidelink UEs may include shared or unlicensed radio frequency spectrum in which devices that are to access a channel perform a contention-based channel access procedure that provides fair channel access to the unlicensed or shared radio frequency spectrum. For example, a UE may perform a listen-before-talk (LBT) procedure (e.g., a clear channel assessment (CCA)) and determine whether signals from another device are detected on a channel or sub-channel. In the event that other signals indicative of another device using the channel are not detected, the UE may determine that the channel is available and transmit a reservation signal to indicate to other UEs that the channel is reserved for a channel occupancy time (COT).

As discussed herein, in some cases a UE may transmit one or more repetitions of a communication in order to enhance the likelihood of successful reception of the communication. Such techniques may be used, for example, in cases where a communication has a high priority, where the communication has a low latency target and/or a high reliability, where channel conditions are relatively unfavorable, or any combinations thereof. In wireless communication networks that use licensed radio frequency spectrum, the availability of a channel to transmit one or more of such repetitions may be known based on scheduling of resources for UE communications. Thus, in such cases, a UE may identify a set of resources for a communication and one or more sets of resources for repetitions (e.g., reservations for future resources) of the communication. The communication and associated resources may then be transmitted using the identified resources. However, in cases where unlicensed or shared radio frequency spectrum is used for such communications, the availability of the channel may be dependent upon a successfully completed contention-based channel access procedure (e.g., a LBT or CCA procedure).

In some examples, resource reservation for one or more repetitions of a communications may be identified relative to a COT and determined based on a COT timing. In some cases, a first UE may transmit a first communication to a second UE during a first COT and may reserve resources of one or more subsequent COTs for one or more repetitions of the first communication. The first UE may transmit an indication of a reservation for reserved resources. In some cases, the reserved resources may be identified based at least in part on a two stage resource reservation, in which reserved resources are identified relative to a timing of the transmission of the reservation indication or the end of the first COT. Such a UE may first determine a timing of a second COT and may then determine a timing of the reserved resources based on the timing of the second COT. In some cases, the reserved resources may be identified based at least in part on one or more offsets from a starting time of the second COT. The first UE may transmit one or more additional instances of the first communication using the reserved resources.

In some examples, an indication of the reserved resources may be provided with sidelink control information (SCI) that is transmitted by the first UE. In some cases, one or more of the reserved resources may be within shared COTs that are obtained (contended and won) by a different UE than the first UE. The UEs receiving the SCI indicating the reserved resources may respect the reservations by refraining from transmitting during a period (e.g., 0.5 ms to 2 ms, 1 symbol, or 2 symbols for example) immediately before each reserved resource and during each reserved resource within the one or more subsequent COTs. However, if the reserved resources are unused by the reserving UE, the other UEs may contend for the reserved resources.

In some examples, sidelink transmissions are slot-based, such that a sidelink transmission is specified to start on a slot boundary. However, some other communication protocols, such as WiFi, can transmit immediately upon clearing a look-before-talk (LBT) and may block the sidelink transmission. Therefore, for some sidelink transmissions, such as sidelink transmissions in an unlicensed spectrum (e.g., SL-U), access to a channel may fail or may be delayed in the presence of WiFi. Some communication systems, such as NR-U, use mini-slot and slot search space switching to allow a transmitter to transmit within a mini-slot after clearing the LBT instead of waiting until a next slot boundary. In such communication systems, the mini-slot introduces a new transmission starting point.

Still, an increase in a number of transmission starting points, may cause a receiver to monitor more physical sidelink control channel (PSCCH) candidate locations. Thus, there may be a tradeoff between PSCCH decoding complexity, at the receiver, and a LBT channel access success rate. In some sidelink networks, two transmission starting positions may be implemented across a sidelink (SL) slot. As an example, one starting position (e.g., starting symbol) may correspond to a half-slot and another starting position may correspond to a full-slot. In some examples, a half-slot structure with an automatic gain control (AGC) symbol and PSCCH/PSSCH symbols may be specified. The half-slot may be half of a full sidelink slot. For example, the sidelink transmitter may be configured with a full-slot resource pool and a half-slot resource pool which may overlap in time and frequency. The half-slot resource pool may be associated with one 7-symbol half-slot, which starts at symbol #7 and ends at symbol #13. The combination of the two types of resource pools provides the sidelink UE with an additional starting symbol. The transmitter may choose the resource pool with the earliest transmission starting point after clearing the LBT and, if it selects the half-slot RP, switch to full-slot-based RP after an initial half-slot in the COT for better spectrum efficiency. From the receiver's point of view, because the AGC/PSCCH/PSSCH could start at a first starting symbol, such as symbol #0, or a second starting symbol, such as symbol #7, based on the LBT outcomes, the receiver may be specified to monitor two PSSCH occasions in each (full) slot. Still, the use of a full-slot and half-slot may increase transmitter and receiver complexity.

Various aspects of the present disclosure are directed to reducing transmitter and/or receiver complexity. In some examples, transmitter complexity may be reduced by avoiding multiple encoding hypotheses with different transport block (TB) sizes based on an initial slot of the COT being a full-slot or half-slot transmission. In some examples, the transmitter can determine the TB size for the initial (full or half) slot of the COT transmission based on a fixed number of resources, such as a half-slot of resources or a full-slot of resources.

In some other examples, receiver complexity may be reduced by skipping one or more PSCCH monitoring occasions. For example, for a given resource block (RB) set, if there is a first transmitter that clears the LBT before a first starting symbol (e.g., symbol #0) and starts a full-slot transmission, it is less likely for a second transmitter to clear the LBT in the middle of the full-slot transmission and start a half-slot transmission from symbol #7, unless two transmitters are outside the range of the receiver. Based on the receiver capability, a lower capability receiver may skip the PSCCH monitoring at later potential PSCCH candidate locations within a slot if the SCI-1 associated with a full-slot or PSCCH demodulation reference signal (DMRS) associated with a full-slot is detected in the earlier candidate location within the same slot and RB set. More specifically, if the SCI-1 is decoded and the reference signal received power (RSRP) associated with the SCI-1 is greater than a preconfigured threshold, the receiver can skip the PSCCH monitoring in the remainder of the slot. Alternatively, if the RSRP associated with the PSCCH DMRS is greater than a preconfigured threshold, the receiver can skip the PSCCH monitoring in the remainder of the slot.

Various aspects of the subject matter described herein may be implemented to realize one or more of the following potential advantages. The techniques employed by the described base stations and UEs may provide benefits and enhancements to the operation of a wireless communications system. For example, operations performed by the UEs may provide improvements to reduce the complexity of a transmitter and/or a receiver. Reducing the complexity may decrease power use, thereby extending battery life. Reducing transmitter and/or receiver complexity may also increase network bandwidth.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 1050 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS, which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless communication network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing wireless communication network 100. A UE 115 may also be a machine specifically configured for connected communication, including machine type communication (MTC), enhanced MTC (eMTC), narrowband IoT (NB-IoT), and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services, which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI, and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. Conversely, the LBT results in a failure when a channel reservation signal is detected in the channel. A TXOP may also be referred to as channel occupancy time (COT).

Additionally, an LBT may be in a variety of modes. An LBT mode may be, for example, a category 4 (CAT4) LBT or a category 2 (CAT2) LBT. A CAT2 LBT refers to an LBT without a random backoff period. A CAT4 LBT refers to an LBT with a random backoff and a variable contention window (CW). A serving BS 105 may perform a CAT4 LBT to acquire a COT for communication with a UE. Additionally, the BS 105 may transmit a COT indication, for example, at the beginning of the COT, to indicate a duration of the COT and/or one or more subbands where the COT. The serving BS 105 may share the COT with a UE 115. To share the BS 105's COT, the UE may perform a CAT2 LBT within the BS 105's COT. Upon passing the CAT2 LBT, the UE may transmit a UL transmission within the BS 105's COT. A UE 115 may also acquire a COT outside of a COT of the serving BS 105 for UL transmission by performing a CAT4 LBT. In some instances, the UE 115 may also share the UE 115's COT with the BS 105. In some instances, the CAT4 LBT mode may be referred to as a type 1 LBT, and the CAT2 LBT mode may be referred to as a type 2 LBT.

Figure 2:
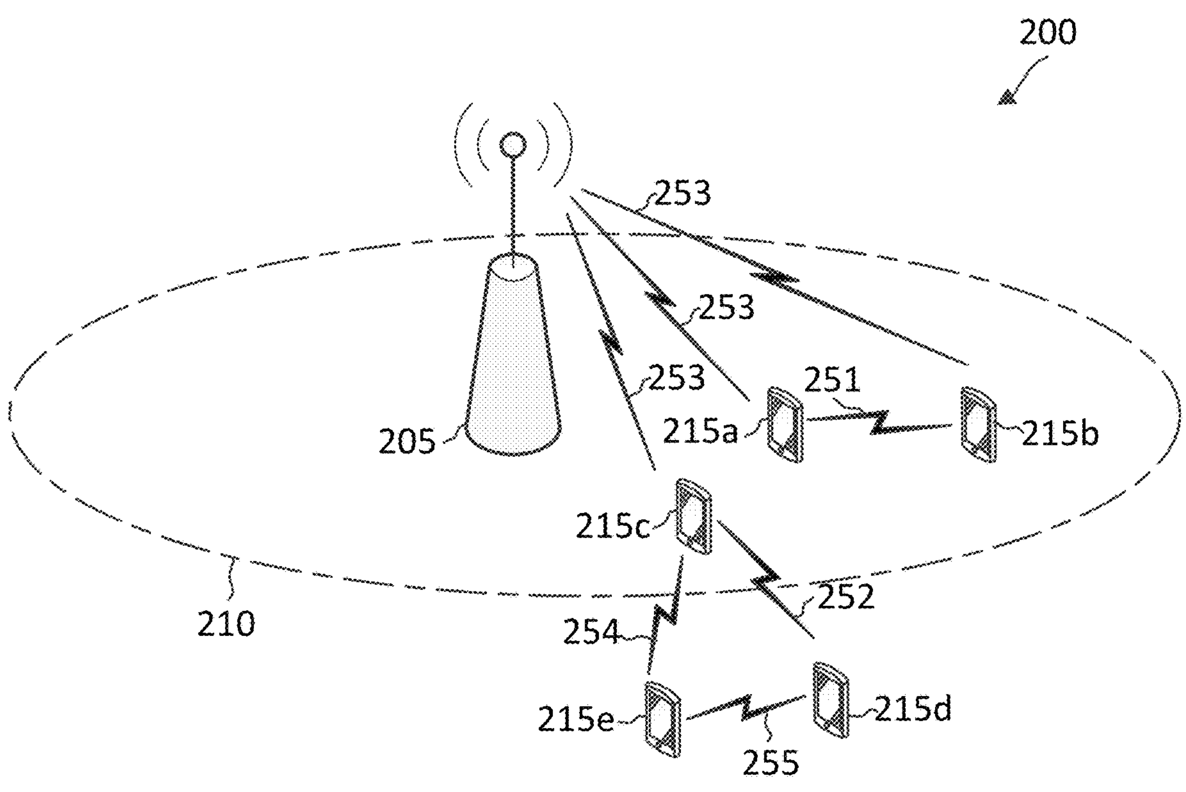
FIG. 2 illustrates a wireless communication network that provisions for sidelink communications, in accordance with various aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. Sidelink communication can also be communicated over a physical sidelink feedback control channel (PSFCH), which indicates an acknowledgement (ACK)-negative acknowledgement (NACK) for a previously transmitted PSSCH.

FIG. 2 illustrates an example of a wireless communication network 200 that provisions for sidelink communications according to aspects of the present disclosure. The network

200 may correspond to a portion of the network 100. FIG. 2 illustrates one BS 205 and five UEs 215 (shown as 215*a*, 215*v*, 215*c*, 215*d*, and 215*e*) for purposes of simplicity of discussion, though it will be recognized that aspects of the present disclosure may scale to any suitable number of UEs 215 (e.g., the about 2, 3, 4, 5, 7 or more) and/or BSs 205 (e.g., the about 2, 3 or more). The BS 205 and the UEs 215 may be similar to the BSs 105 and the UEs 115, respectively. The BS 205 and the UEs 215 may share the same radio frequency band for communications. In some instances, the radio frequency band may be a licensed band. In some instances, the radio frequency band may be an unlicensed band (e.g., in a 5 GHz band). In some instances, the radio frequency band may be a frequency range 1 (FR1) band. In some instances, the radio frequency band may be a FR2 band. In general, the radio frequency band may be at any suitable frequency and may have any suitable bandwidth (e.g., about 5 MHz, about 10 MHz, about 20 MHz, about 80 MHz, about 100 MHz or more).

In the network 200, some of the UEs 215 may communicate with each other in peer-to-peer communications. For example, the UE 215*a* may communicate with the UE 215*b* over a sidelink 251, the UE 215*c* may communicate with the UE 215*d* over a sidelink 252 and/or with the UE 215*e* over a sidelink 254, and the UE 215*d* may communicate with the UE 215*e* over a sidelink 255. The sidelinks 251, 252, 254, and 255 are unicast bidirectional links. Some of the UEs 215 may also communicate with the BS 205 in a UL direction and/or a DL direction via communication links 253. For instance, the UE 215*a*, 215*b*, and 215*c* are within a coverage area 210 of the BS 205, and thus may be in communication with the BS 205. The UE 215*d* and UE 215*e* are outside the coverage area 210, and thus may not be in direct communication with the BS 205. In some instances, the UE 215*c* may operate as a relay for the UE 215*d* to reach the BS 205. In some aspects, some of the UEs 215 are associated with vehicles (e.g., similar to the UEs 115*i-k*) and the communications over the sidelinks 251 and/or 252 may be C-V2X communications. C-V2X communications may refer to communications between vehicles and any other wireless communication devices in a cellular network.

Figure 3:
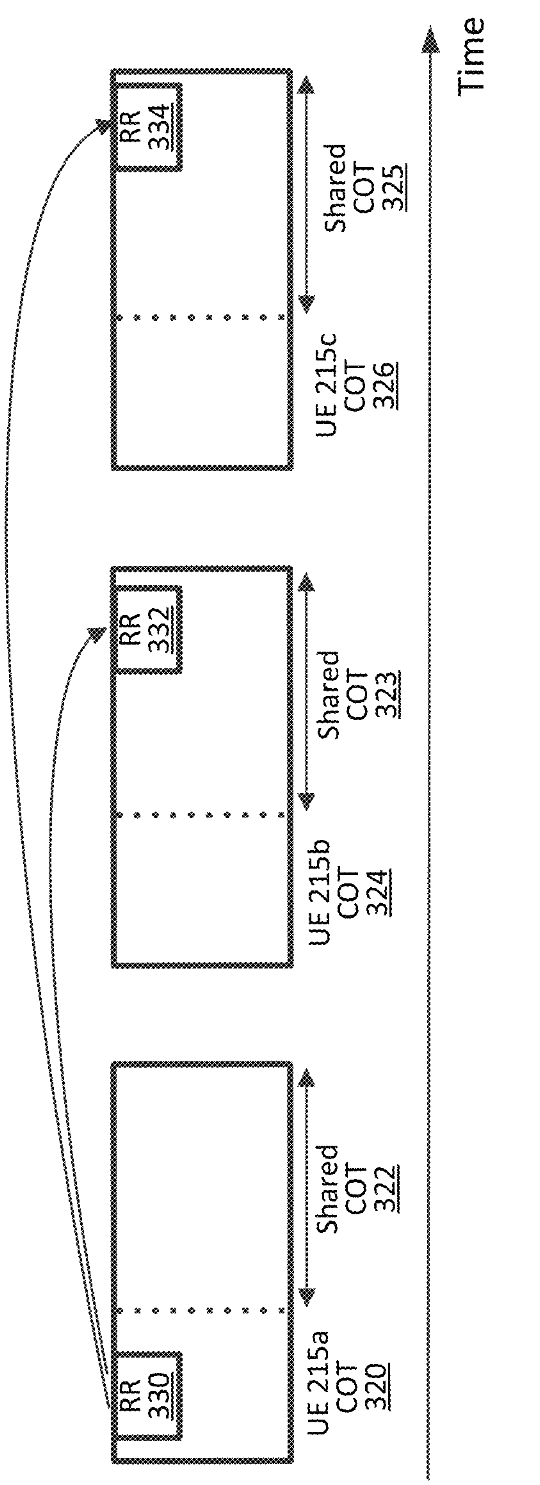
FIG. 3 illustrates reserved resources for sidelink communications, in accordance with various aspects of the present disclosure.

FIG. 3 illustrates reserved resources (e.g., time and frequency resources) for sidelink communications, according to some aspects of the present disclosure. In some instances, the methods of reserving resources in COTs may implement aspects of wireless communication network 100 or 200 as described above. In one example, a first UE may reserve resources in future COTs for sidelink communications with a peer UE.

For example, a first UE 215*a* (e.g., a UE 115 UE 215 of FIG. 1 or 2) may perform a LBT to obtain a UE COT 320 in a shared channel for communications, for example, with a peer sidelink UE. The LBT may be a CAT4 LBT. The LBT may be a pass indicating that the shared channel is clear for transmission. The first UE 215*a* may share a portion (shown as a first shared COT 322) with other UEs. That is, the first shared COT 322 may be used by other UEs for transmissions. Upon successfully obtaining first UE COT 320, the first UE 215*a* may provide a COT indication that identifies the first UE COT 320 and the first shared COT 322. The COT indication may include a start time, a duration, and/or an end time of the first UE COT 320, and/or a start time, a duration, and/or an end time of the first shared COT 322. Similarly, a second UE 215*b* may perform a LBT to obtain a second UE COT 324 in a shared channel for communications, for example, with a peer sidelink UE. The LBT may be a CAT4 LBT. The LBT may be a pass indicating that the shared channel is clear for transmission. The second UE 215*b* may share a portion (shown as a second shared COT 323) with other UEs. That is, the second shared COT 323 may be used by other UEs for transmissions. Upon successfully obtaining second UE COT 324, the second UE 215*b* may provide a COT indication that identifies the second UE COT 324 and the second shared COT 323. The COT indication may include a start time, a duration, and/or an end time of the second UE COT 324, and/or a start time, a duration, and/or an end time of the second shared COT 323. Similarly, a third UE 215*c* may perform a LBT to obtain a third UE COT 326 in a shared channel for communications, for example, with a peer sidelink UE. The LBT may be a CAT4 LBT. The LBT may be a pass indicating that the shared channel is clear for transmission. The third UE 215*c* may share a portion (shown as a third shared COT 325) with other UEs. That is, the third shared COT 325 may be used by other UEs for transmissions. Upon successfully obtaining the third UE COT 326, the third UE 215*c* may provide a COT indication that identifies the third UE COT 326 and the third shared COT 325. The COT indication may include a start time, a duration, and/or an end time of the third UE COT 326, and/or a start time, a duration, and/or an end time of the third shared COT 325.

In some instances, the first UE 215*a* may perform an LBT before the reserved resource 332 to obtain a COT so that the reserved resource 332 is within the first UE 215*a*'s COT. Similarly, the first UE 215*a* may perform an LBT before the reserved resource 334 to obtain a COT so that the reserved resource 334 is within the first UE 215*a*'s COT, and so on. Accordingly, the reserved resource 332 and the reserved resource 334 are within future COTs of the first UE 215*a*. In other instances, the reserved resources 332 and 334 can fall within another UE's COT. For instance, another UE 215*b* may perform an LBT to obtain the COT 324, and the reserved resource 332 can be within a shared portion (shown as 323 of the UE 215*b*'s COT 324). For another example, another UE 215*c* may perform an LBT to obtain the COT 326, and the reserved resource 334 can be within a shared portion (shown as 325 of the UE 215*c*'s COT 326).

Figure 4:
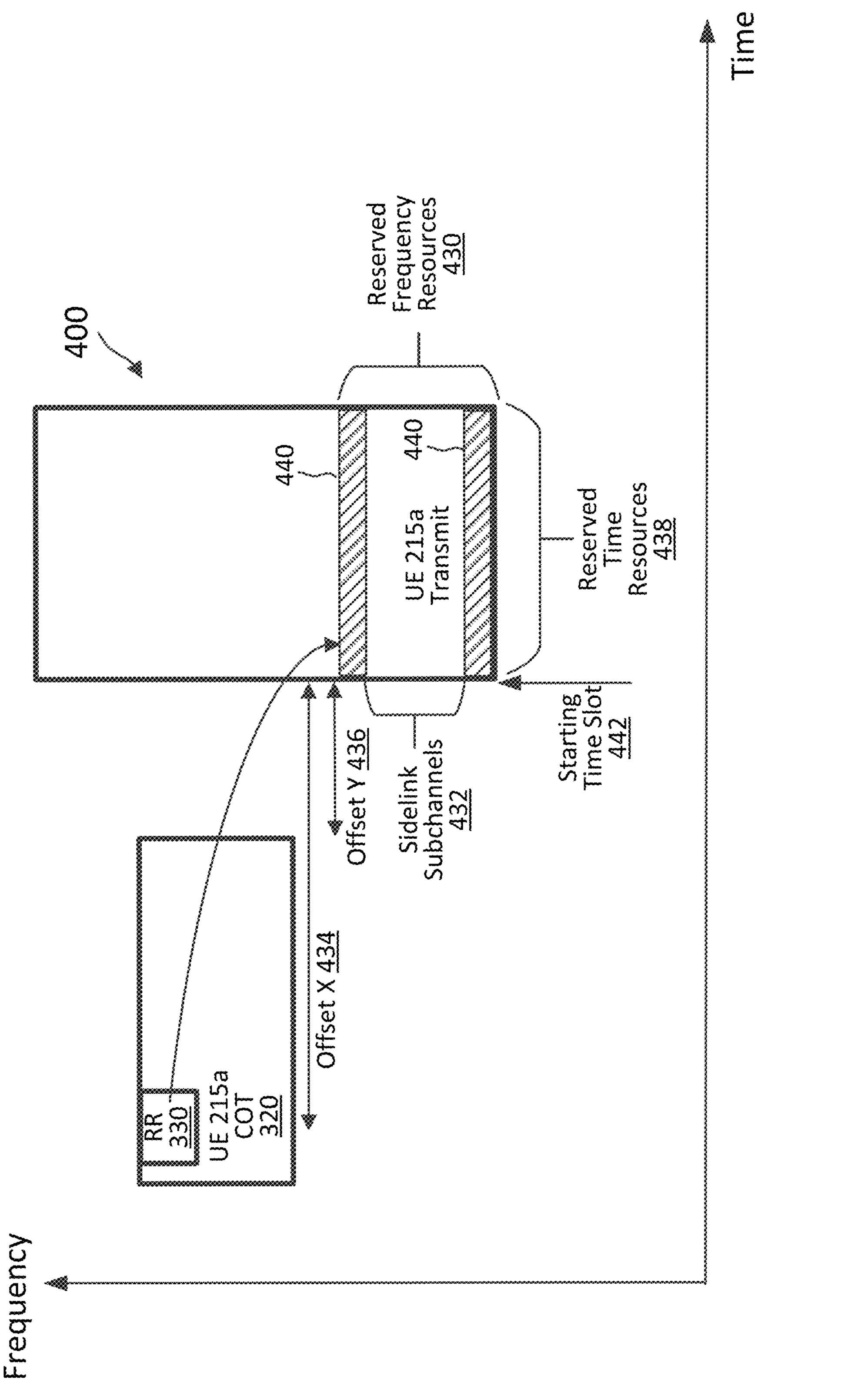
FIG. 4 illustrates reserved resources for sidelink communications, in accordance with various aspects of the present disclosure.

FIG. 4 illustrates reserved resources 400 for sidelink communications, according to some aspects of the present disclosure. In FIG. 4, the x-axis may represent time in some arbitrary units, and the y-axis may represent frequency in some arbitrary units. The reserved resources 400 may be reserved for a UE (e.g., UEs 115, UEs 215) performing sidelink communications in a wireless communications network (e.g., wireless communication network 100 or 200). For example, the resources 400 may be reserved for UE 215*a* retransmissions of a first transmission (e.g. retransmissions of a failed first transmission), for example, in a reserved resource (RR) 330. In some instances, UE 215*a* may transmit one or more transport blocks within COT 320. The UE 215*a* may also reserve future resources (e.g. one or more symbols or one or more time slots in time and one or more frequency subcarriers or one frequency subchannels in frequency) for retransmissions. In some instances, the UE 215*a* may reserve the future resources within the same COT 320 save overhead associated with the LBT. In other instances, the UE 215*a* may reserve the future resources in future COTs (after the COT 320). In the illustrated example of FIG. 4, the UE 215*a* reserves a future resource 400. The UE 215*a* may transmit, in the COT 320, an indication of a reservation for the future resources 400. Other UEs within communication range of the UE 215*a* may respect the resource reservation and refrain from contending for the reserved resources 400. Additionally, the other UEs may not transmit during a time period (e.g., about 1 symbol time) immediately before the reserved resources 400 so that the UE 215*a* may perform an LBT during that time period and gain access to the channel for transmission in the reserved resource 400. The time period to be used for LBT by the UE 215*a* may be referred to as a gap time period. The other UEs that receive the resource reservations may refrain from transmitting within the reserved resources and the gap time period. However, the other UEs may contend for resources outside of the reserved resources and the gap time period. In some instances, another UE may successfully obtain a COT before the gap time period, and may share a portion of the COT as discussed above with reference to FIG. 3. In some instances, the reserved resource 400 may be within the shared COT of the other's UE. In such instances, the UE 215*a* may perform a CAT2 LBT (instead of a CAT4 LBT) before transmitting in the reserved resources 400.

The UE 215*a* may reserve future reserved resources 400 by transmitting the resource reservation in a channel occupancy time system information (COT SI), for example, within SCI-1 and/or SCI-2. The COT SI may be transmitted within a COT that was obtained by performing an LBT (e.g., CAT4 LBT) to gain access to the COT 320. In some instances, the COT SI may be transmitted from a reserved resource 330. The resource reservation may include information related to the reserved resources 400. For example, the resource reservation may include information elements indicating the number of time slots (e.g., contiguous time slots) reserved within reserved time resources 438. The resource reservation may also include the number of frequency subchannels reserved in the reserved frequency resources 430. In some instances, the reserved frequency resources 430 may include sidelink subchannels 432 in which the UE 215*a* may transmit and frequency guard bands 440 on either side (e.g., an upper frequency edge and a lower frequency edge) of the sidelink subchannels in which the UE 215*a* may refrain from transmitting. For instance, in some aspects, a frequency band may be partitioned into multiple subchannels similar to the sidelink subchannels 432 with guard bands similar to the guard bands 440 between subchannels. The guard bands are inserted between subchannels to mitigate interference from neighboring subchannels. Thus, the guard bands are not to be used for transmissions, for example, when adjacent subchannels are used for transmission by different UEs.

In some instances, the resource reservation carried in the COT SI may include information related to the starting time slot 442 of the reserved resources 400. For example, the resource reservation in the COT SI may indicate a timing offset Y 436 that indicates the timing of the starting time slot 442 based on an amount of time from the end of the COT 320 in which the resource reservation carried in the COT SI was transmitted. Stated differently, the COT SI may indicate a starting time of the resource 400 with respect to the end of the COT 320 in which the resource reservation carried in the COT SI was transmitted. In some instances, the UE 215*a* may transmit multiple COT-SIs within the current COT 320, for example, to indicate the end of the current COT 320.

As another example, the resource reservation in the COT SI may indicate a timing offset X 434 that indicates the timing of the starting time slot 442 based on an amount of time from the transmission of the COT SI. Stated differently, the COT SI may indicate a starting time of the resource 400 with respect to a transmission time of the COT SI that reserves the resource 400. For example, offset X 434 may be the amount of time from the beginning of the time slot in which the COT SI was transmitted. As another example, offset X 434 may be the amount of time from the end of the time slot in which the COT SI was transmitted.

Sidelink (SL) mini-slot access may be used to improve a channel access success rate in view of competition for channel access from asynchronous WiFi. The mini-slot may provide at least two different transmission starting points. In some examples, the mini-slot structure integrates an automatic gain control (AGC) symbol and may be specified for a physical sidelink control channel (PSCCH) or a physical sidelink shared channel (PSSCH). In some such examples, the PSSCH may be rate matched to close the mini-slot end gape for a channel occupancy time (COT) burst.

In some examples, a half-slot resource pool (RP) may overlap a full-slot counterpart. In some such examples, a sidelink transmitter may be configured with the full-slot RP (e.g., symbols #0-#13) and a half-slot RP (e.g., symbols #7-13), which may overlap in time and frequency. The half-slot RP may be associated with one 7-symbol half-slot, which starts at symbol #7 and ends at symbol #13. The half-slot RP is not limited to symbols #7-13, other symbol combinations may be considered. This overlap offers additional transmission entry points, such that a transmitter can initiate a transmission as soon as the listen-before-talk (LBT) process clears, rather than waiting for the onset of the slot boundary. The half-slot RP may be used when the LBT clears after a slot boundary, whereas the full-slot RP may be used when the LBT clears at or before the slot boundary. That is, the transmitter chooses the RP with the earliest start time in accordance with the LBT clearance.

Figure 5A:
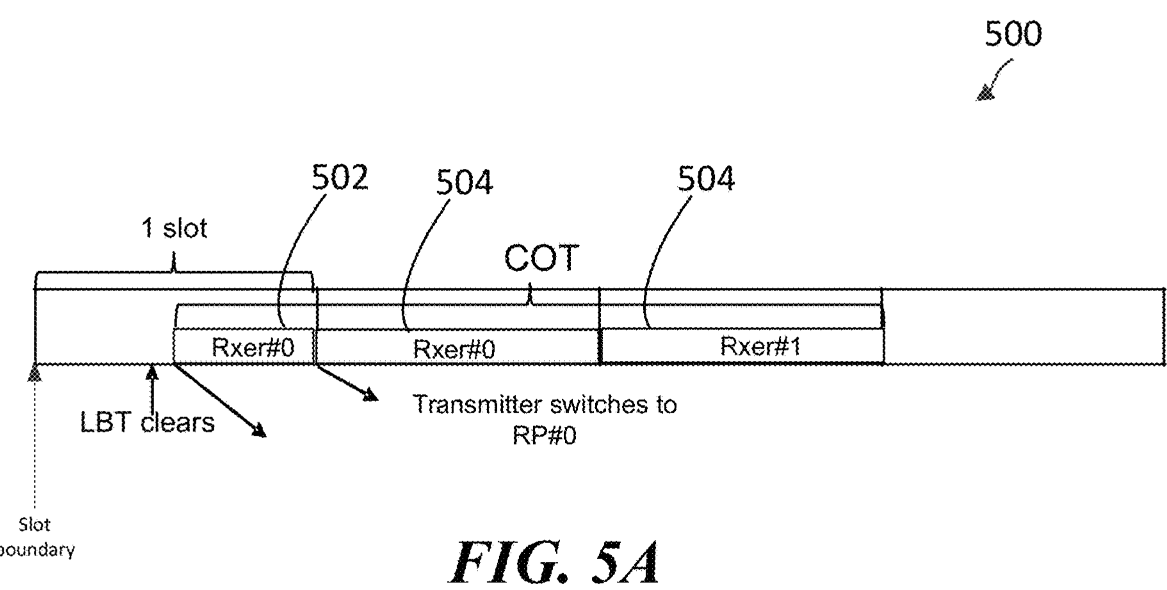
FIG. 5A is a block diagram illustrating an example of a transmitter selecting a half-slot in accordance with an LBT clearing after a slot boundary, in accordance with various aspects of the present disclosure.

FIG. 5A is a block diagram illustrating an example 500 of a transmitter selecting a half-slot 502 in accordance with an LBT clearing after a slot boundary, in accordance with various aspects of the present disclosure. As shown in the example 500, the LBT clears after the slot boundary and before a starting point of a half-slot RP 502 (RP #1) within a slot. Therefore, to secure the COT, the transmitter may use the half-slot RP 502 in a first slot and use full-slot RPs 504 (RP #0) in subsequent slots. In some examples, the RPs 502 and 504 may be designated for transmissions to different receivers (shown as Rxer #0 and Rxer #1). In some examples, a first receiver (Rxer #0) may be a high capability receiver and a second receiver (Rxer #1) may be a low capability receiver.

Figure 5B:
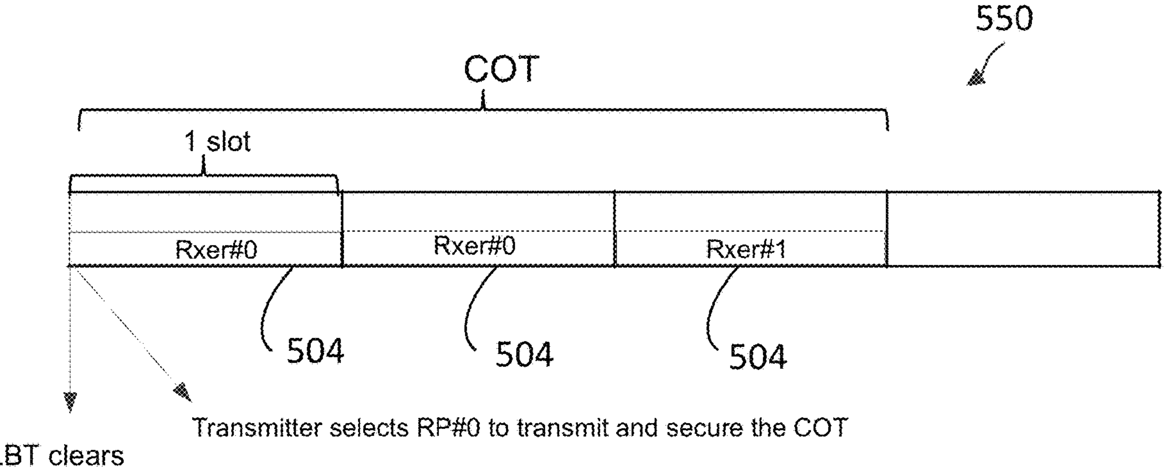
FIG. 5B is a block diagram illustrating an example of a transmitter selecting a full-slot in accordance with an LBT clearing after a slot boundary, in accordance with various aspects of the present disclosure.

FIG. 5B is a block diagram illustrating an example 550 of a transmitter selecting a full-slot 504 in accordance with an LBT clearing after a slot boundary, in accordance with various aspects of the present disclosure. As shown in the example 550, the LBT clears at the slot boundary. Therefore, to secure the COT, the transmitter may use the full-slot RP 504 (RP #0) for all slots associated with the COT. In some examples, the RPs 502 and 504 may be designated for transmissions to different receivers (shown as Rxer #0 and Rxer #1).

In some examples, a capability of a UE and a type of cast (e.g., broadcast, groupcast, multicast) may determine whether the UE (e.g., receiver) monitor both the half-slot RP (e.g., mini-slot) and the full-slot RP, or only on the full-slot RP. For example, groupcast or broadcast transmissions may be limited to the full-slot RP. In some examples, the transmitter may schedule transmissions to high-capability UEs through the mini-slot RP or a combination of a half-slot RP and a full-slot RP at the start of the data burst. In some examples, a conventional hybrid automatic repeat request (HARQ) timeline and the physical sidelink feedback channel (PSFCH) mapping rule may be used for the half-slot RP and full-slot RP. In situations where the PSFCH instance aligns with the current slot, the transmitter designates the last two symbols of the half-slot to the PSFCH.

As discussed, mini-slot channel access may be used to improve the reliability of transmissions on sidelink unlicensed bands (SL-U) when WiFi or other radio access technologies (RATs) are present. For example, if a link is configured to support mini-slot (e.g., half-slot) channel access, the receiver may monitor sidelink control information (SCI) at multiple starting symbols within a slot. The UE implementation may be feasible if the number of PSCCH candidates per slot is less than or equal to 44 because the UE could support up to 44 blind PDCCH hypotheses in a cellular link (e.g., Uu link). The number of PSCCH candidates per (full) slot, when half-slots are supported, equals the number of subchannels X 2. For example, for SCS 30 KHz, the receiver could support up to 80 MHz if 5 subchannels are included per 20 MHz, while for SCS 15 KHz, up to 40 MHz can be supported with 10 subchannels per 20 MHz.

Nonetheless, the mini-slot channel access may increase receiver and/or transmitter complexity, which may decrease bandwidth. For example, as discussed, a transmitter may use a full-slot RP or a half-slot RP for a PSSCH based on when an LBT clears—either at the start or mid-way through the slot. In some examples, a UE timeline may not accommodate re-encoding the PSSCH following the results of the LBT. In some such examples, if the transmitter configures a transport block (TB) anticipating a full-slot allocation and the LBT fails, the transmitter may re-encode the data to accommodate a half-slot allocation. Therefore, the transmitter complexity may increase by encoding multiple hypotheses with different TB sizes. In some examples, transmitter complexity may be reduced by avoiding multiple encoding hypotheses with different TB sizes (TBSs) based on the first slot of the COT being a full-slot or half-slot transmission. In some such examples, the transmitter can determine the TBS for the first (full or half) slot of the COT transmission based on the half-slot worth of resources. In some implementations, if half-slot channel access is enabled, the TBS for the first slot (full-slot or half-slot depending on LBT outcome) of the COT transmission may be selected based only on half-slot resources or full-slot resources. In such examples, transmitter complexity may be reduced by avoiding multiple encoding hypotheses with different transport block (TB) sizes.

In some examples, to avoid re-encoding hypotheses for the PSCCH and/or the PSSCH, the transmitter may configure two separate waveform hypotheses for the PSCCH and PSSCH. Such waveforms may be stored within a designated buffer. In such examples, the transmitter may store both full-slot and half-slot waveform hypotheses. The transmitter may select one of these waveforms in accordance with an outcome of the LBT. Specifically, the transmitter may select one of these waveforms in accordance with a timing of the LBT clearance within a given slot. Depending on the timing of the LBT clearance, the transmitter may map and rate-match the PSCCH and PSSCH to either a half-slot or a full-slot. This mapping produces an inverse fast Fourier transform (IFFT) waveform.

For an initial slot of a COT, a transport block size (TBS) may be determined based on a predetermined number of resources. In some examples, these resources are half-slot resource. In such examples, a full-slot PSSCH may be rate matched to align with full-slot resources. In some other examples, the resources are full-slot resources. In such examples, the transmitter may puncture the half-slot PSSCH resource elements (REs). That is, the transmitter may omit certain REs from the half-slot PSSCH.

Figure 6:
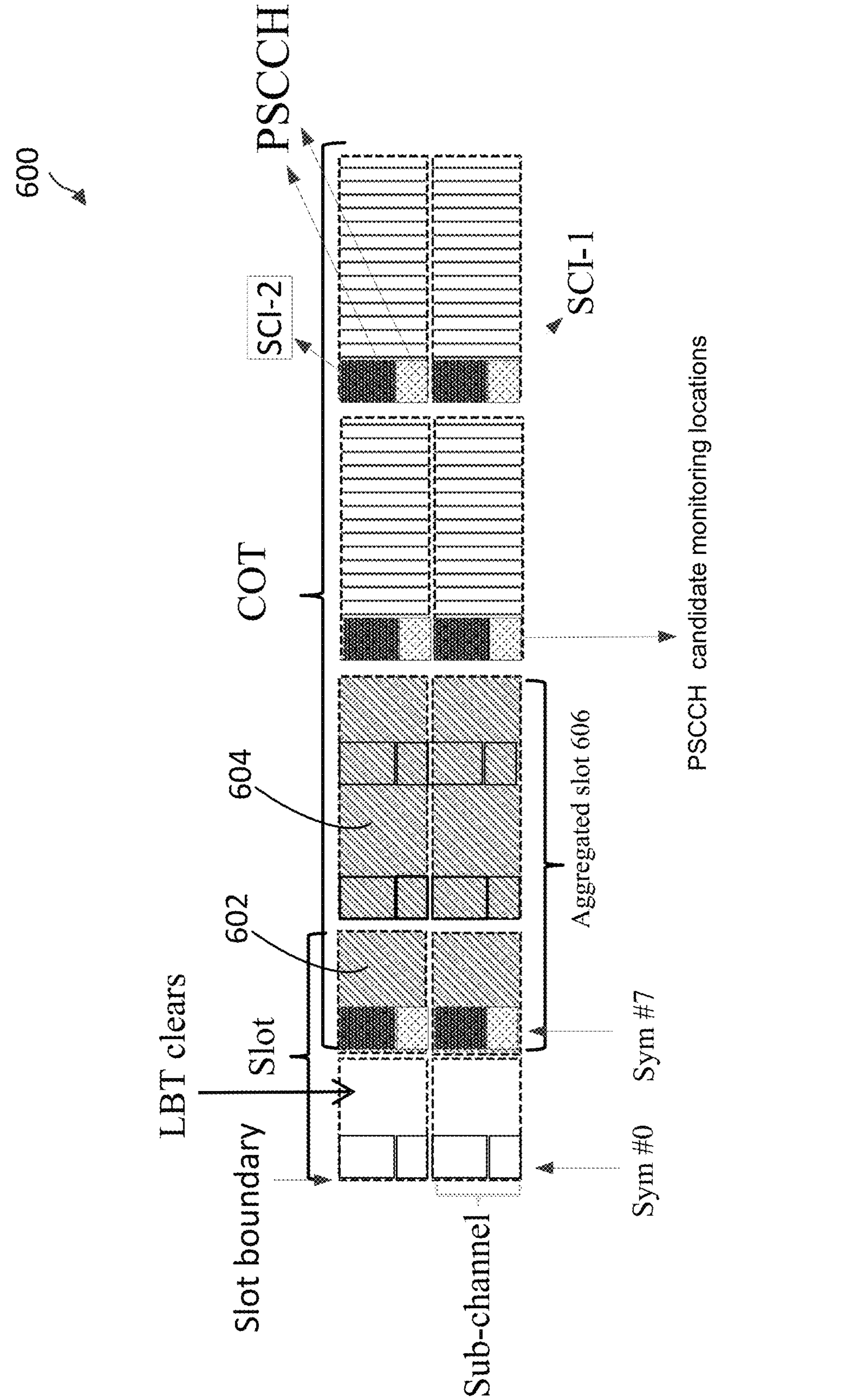
FIG. 6 is a block diagram illustrating an example of an aggregated half-slot and full-slot, in accordance with various aspects of the present disclosure.

In some other examples, the transmitter may combine a half-slot and a full-slot. FIG. 6 is a block diagram illustrating an example 600 of an aggregated half-slot 602 and full-slot 604, in accordance with various aspects of the present disclosure. In the example of FIG. 6, a transmitter, such as a sidelink UE, may have two PSCCH/PSSCH waveforms hypotheses. One full-slot waveforms hypotheses and half-slot waveforms hypotheses. The transmitter may select one of the waveforms hypotheses based on a timing of the LBT clearance. As shown in the example of FIG. 6, the transmitter may aggregate a half-slot 602 and a full-slot 604 to generate an aggregated slot 606 based on the LBT clearance being after a slot boundary and before a starting symbol (symbol #7) associated with the half-slot. The example of FIG. 6 shows slots for multiple sub-channels. Aspects of the present disclosure are contemplated for one or more sub-channels.

As shown in the example of FIG. 6, a PSCCH may be allocated to a second starting symbol (Sym #7) of the half-slot 602 and a first starting symbol (e.g., Sym #0) of the full slot 604. For ease of explanation, only one PSCCH is labeled in FIG. 6. Each PSCCH may include first sidelink control information (SCI-1) and second sidelink control information (SCI-2). The SCI-1 may indicate the combination of the half-slot 602 and the full-slot 604 (e.g., the aggregated slot 606). In some examples, a common demodulation reference signal (DMRS) pattern may be specified, regardless of whether the PSCCH starts in the half-slot 602 or the full-slot 604. The SCI-1 may signal the combination of the half and full-slot. In the example of FIG. 6, the transport block size (TBS) is based on resources from one slot. Depending a timing of the LBT clearance, rate matching and IFFT waveform generation begins either from a first starting symbol (e.g., symbol #0) or a second starting symbol (e.g., symbol #7).

Figure 7:
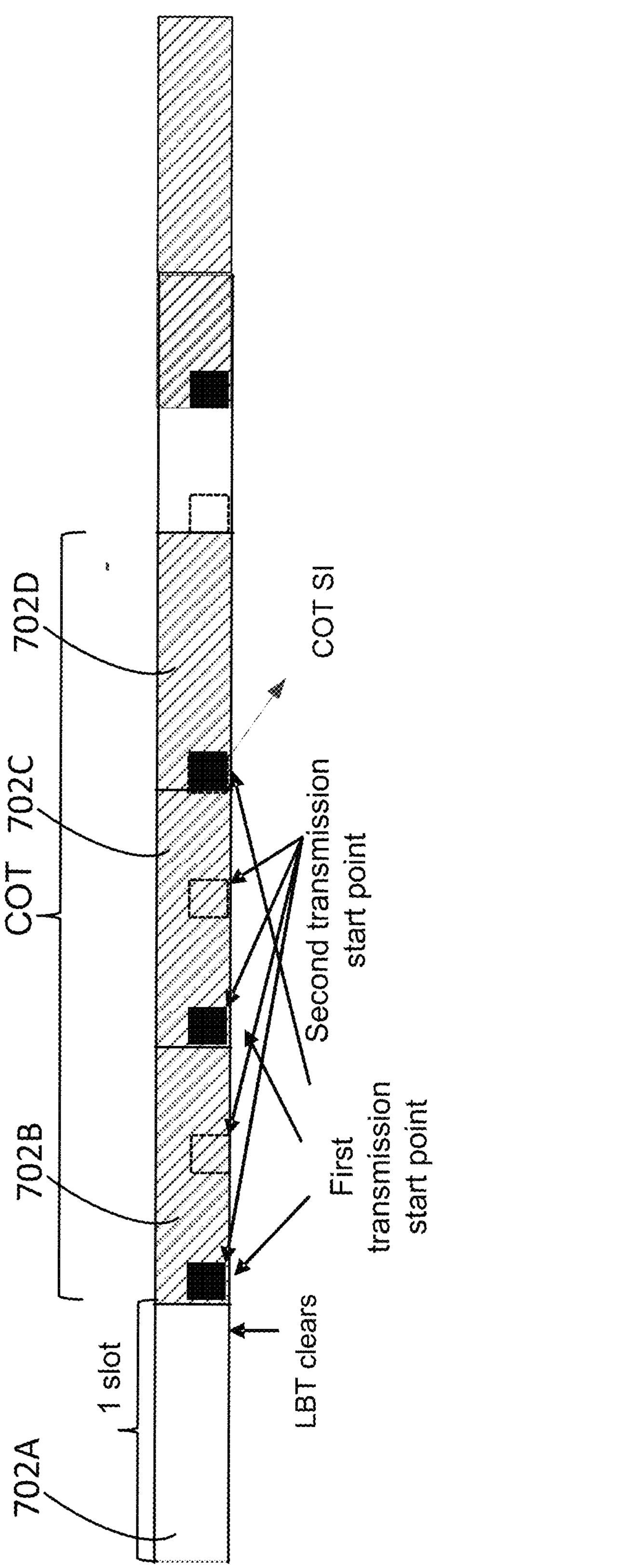
FIG. 7 is a block diagram illustrating an example of a receiver, such as a sidelink UE, monitoring two transmission start points per slot.

In some examples, a complexity of a receiver, such as a sidelink UE, may increase because the receiver may monitor multiple PSCCH candidate locations within a COT. FIG. 7 is a block diagram illustrating an example of a receiver, such as a sidelink UE, monitoring two transmission start points per slot. In the example of FIG. 7, an LBT clears at a first slot 702A, therefore, a COT begins at a second slot 702B. In this example, in both a second slot 702B and a third slot 702C, the receiver may monitor for potential PSCCH transmissions at a first starting symbol (e.g., symbol #0) for a full-slot and a second starting symbol (e.g., symbol #7) for a half-slot. In the example of FIG. 7, at a fourth slot 702D, the receiver may switch to monitoring for PSCCH transmissions at a first starting symbol (e.g., first transmission start point) after receiving COT system information (SI) that includes an RP switching indicator. That is, after receiving the RP switching indicator, the receiver may transition to only a full-slot RP, such that the receiver monitors for one PSCCH per subchannel for each slot. However, in some cases, the RP switching indicator may be received after the receiver has received several slots. Thus, for an initial slot and one or more slots following an initial slot, the receiver may monitor two or more symbols, such as symbol #0 and symbol #7, for possible PSSCH transmissions.

In some examples, PSCCH candidate searches may be reduced, at receiver, based on a skipping rule per slot and per RB-set. In some such examples, the receiver (e.g., receiving sidelink UE) may skip the PSCCH monitoring at later potential PSCCH candidate locations within a slot if the SCI-1 or PSCCH DMRS is detected in the earlier candidate location within the same slot and RB-set. More specifically, if the SCI-1 is decoded and/or the reference signal received power (RSRP) of PSCCH DMRS is greater than a preconfigured threshold at a PSCCH candidate location in a slot and RB-set, the receiver can skip the PSCCH monitoring in the remainder of the slot. Thus, in some implementations, when half-slot access is configured, the receiver may skip the PSCCH monitoring at later potential PSCCH candidate locations in a slot within an RB-set, if SCI-1 and/or PSCCH DMRS is detected in an earlier candidate location and the RSRP is above some preconfigure threshold.

As discussed, monitoring for the PSCCH at candidate locations associated with a half-slot may be unnecessary if a receiver detects both the SCI-1 and PSCCH DMRS at a first transmission start point associated with a full-slot. For example, if the SCI-1 is successfully decoded in a given slot and an RSRP is greater than an RSRP threshold, or if the RSRP of the PSCCH DMRS exceeds the RSRP threshold, the receiver may forgo PSCCH monitoring at a second starting symbol (e.g., second transmission point) associated with the half-slot in the given slot. This process may be repeated for each slot. If neither condition is satisfied, the receiver may persistently scan the PSCCH candidate locations associated with each half-slot. In some other examples, if the transmitter signals a switch to a full-slot RP, via an RP switching indicator included in the COT SI, the receiver stops monitoring the PSCCH candidate locations (e.g., second starting symbol) associated with each subsequent half-slot.

A PSCCH/PSSCH transmission from a sidelink transmitter, targeting a sidelink receiver, in a first starting symbol (e.g., symbol #0) associated with a full-slot, inherently represents a full-slot transmission. Therefore, monitoring a subsequent PSCCH candidate position in the same slot and/or subsequent slots may be unnecessary. Thus, in some other examples, upon decoding the SCI-2 in a given slot and confirming the receiver is the designated recipient, the receiver stops monitoring subsequent PSCCH candidate locations within the given slot, such as PSCCH candidate locations associated with a half-slot. In such examples, the receiver verifies a destination ID included in the SCI-2 to verify that the receiver is the intended recipient. In some such examples, separate handling may be specified for the SCI-2, such that the SCI-2 is decoded before a timing of a PSCCH monitoring occasion associated with a half-slot.

Figure 8:
FIG. 8 is a flow diagram illustrating an example process performed by a sidelink user transmitter, in accordance with various aspects of the present disclosure.
Figure 8:
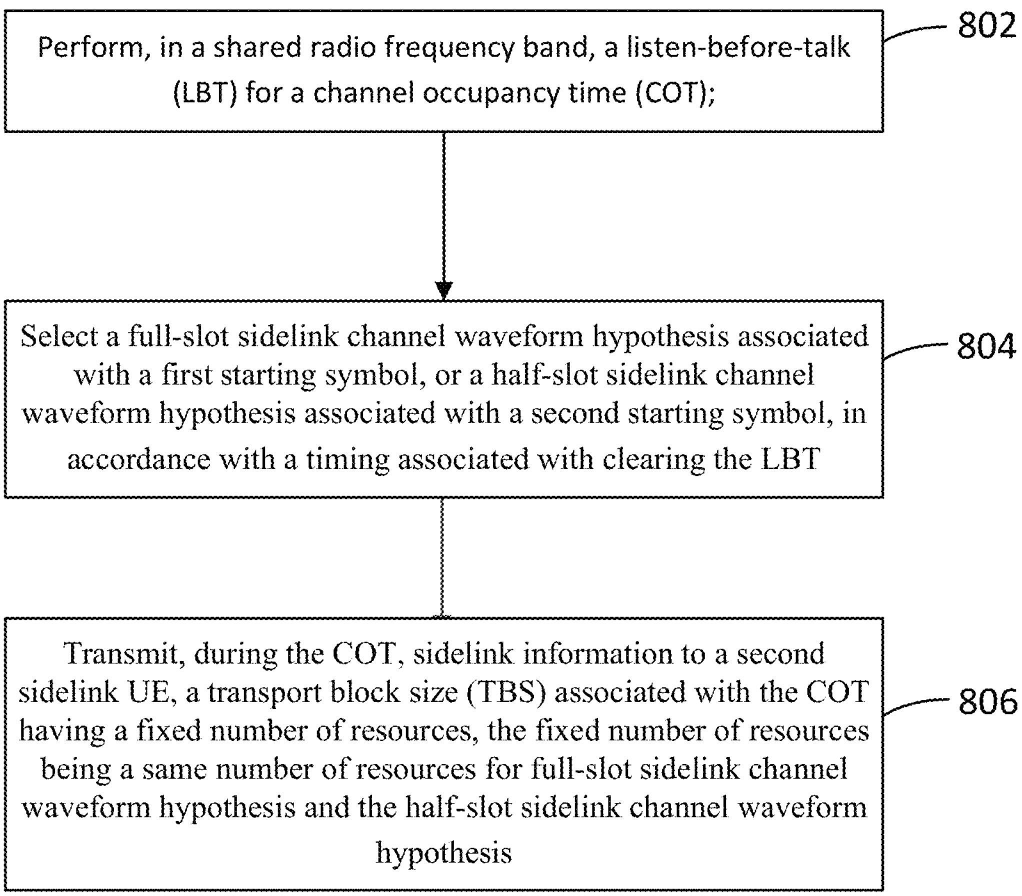

FIG. 8 is a flow diagram illustrating an example process 800 performed by a UE 215, in accordance with some aspects of the present disclosure. The example process 800 is an example of determining a transport block size based on a fixed number of resources regardless of whether an initial slot of a COT is a half-slot or a full-slot. As shown in FIG. 8, the process 800 begins at block 802 by performing, in a shared radio frequency band, a listen-before-talk (LBT) for a channel occupancy time (COT). At block 804, the process 800 selects a full-slot sidelink channel waveform hypothesis associated with a first starting symbol, or a half-slot sidelink channel waveform hypothesis associated with a second starting symbol, in accordance with a timing associated with clearing the LBT. Additionally, at block 806, the process 800 transmits, during the COT, sidelink information to a second sidelink UE, a transport block size (TBS) associated with the COT having a fixed number of resources, the fixed number of resources being a same number of resources for full-slot sidelink channel waveform hypothesis and the half-slot sidelink channel waveform hypothesis. That is, the same fixed number of resources, such as half-slot resources, may be used regardless of selecting the half-slot sidelink channel waveform hypothesis or the full-slot sidelink channel waveform hypothesis.

Figure 9:
FIG. 9 is a flow diagram illustrating an example process performed by a sidelink receiver, in accordance with various aspects of the present disclosure.
Figure 9:
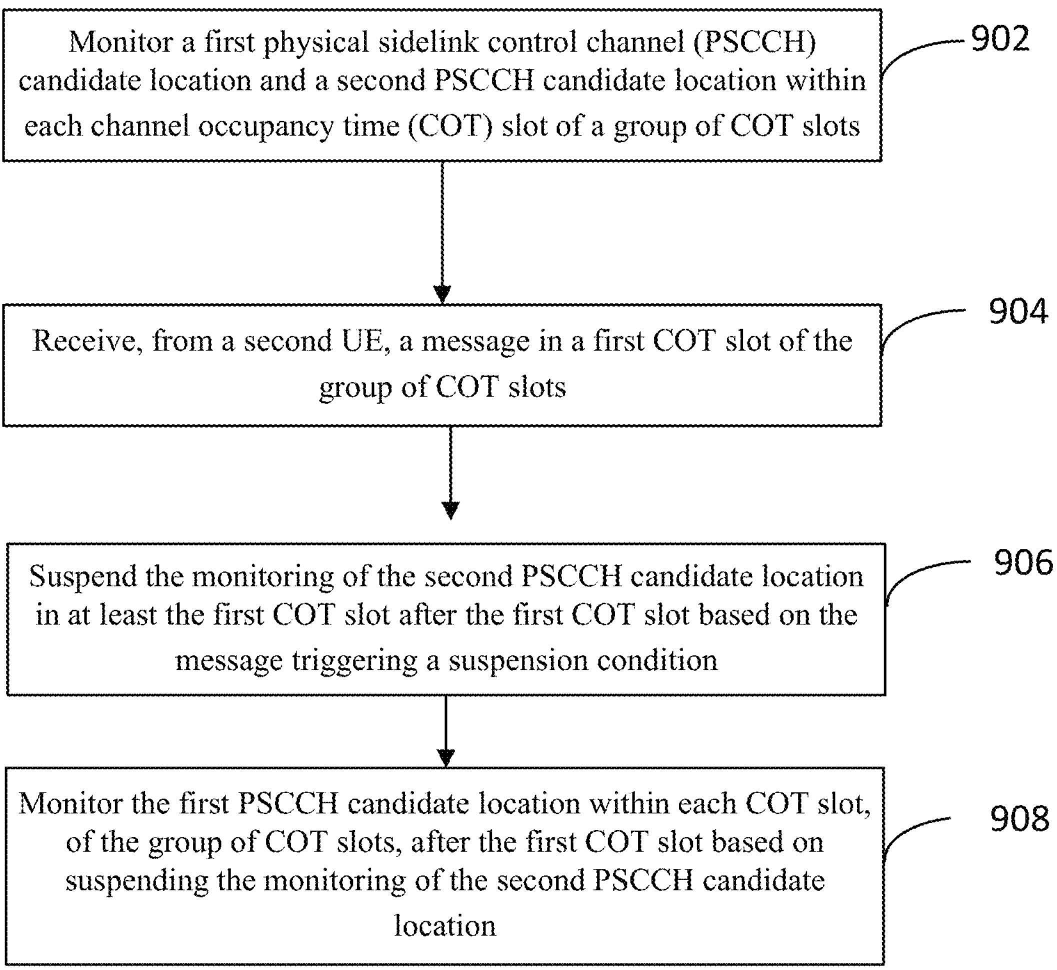

FIG. 9 is a flow diagram illustrating an example process 900 performed by a UE 215, in accordance with some aspects of the present disclosure. The example process 900 is an example of skipping one or more PSCCH monitoring occasions. As shown in FIG. 9, the process 900 begins at block 902 by monitoring a first physical sidelink control channel (PSCCH) candidate location and a second PSCCH candidate location within each channel occupancy time (COT) slot of a group of COT slots. The first PSCCH candidate location occurs prior to the second PSCCH candidate location within each COT slot of the group of COT slots. At block 904, the process 900 receives, from a second UE, a message in a first COT slot of the group of COT slots. At block 906, the process 900 suspends the monitoring of the second PSCCH candidate location in at least the first COT slot after the first COT slot based on the message triggering a suspension condition. At block 908, the process 900 monitors the first PSCCH candidate location within each COT slot, of the group of COT slots, after the first COT slot based on suspending the monitoring of the second PSCCH candidate location.

Implementation examples are described in the following numbered clauses:

Clause 1. performing, in a shared radio frequency band, a listen-before-talk (LBT) for a channel occupancy time (COT); selecting a full-slot sidelink channel waveform hypothesis associated with a first starting symbol, or a half-slot sidelink channel waveform hypothesis associated with a second starting symbol, in accordance with a timing associated with clearing the LBT; and transmitting, during the COT, sidelink information to a second sidelink UE, a transport block size (TBS) associated with the COT having a fixed number of resources, the fixed number of resources being a same number of resources for full-slot sidelink channel waveform hypothesis and the half-slot sidelink channel waveform hypothesis.

Clause 2. The method of Clause 1, further comprising preparing, prior to performing the LBT, the half-slot sidelink channel waveform hypothesis and the full-slot sidelink channel waveform hypothesis, wherein each of the half-slot sidelink channel waveform hypothesis and the full-slot sidelink channel waveform hypothesis corresponds to a respective physical sidelink control channel (PSCCH) waveform and a respective physical sidelink shared channel (PSSCH) waveform.

Clause 3. The method of any one of Clauses 1-2, further comprising selecting the half-slot sidelink channel waveform hypothesis based on the timing being within the initial slot and prior to the second starting symbol of the initial slot.

Clause 4. The method of Clause 3, further comprising mapping and rate matching a physical sidelink control channel (PSCCH) and a physical sidelink shared channel (PSSCH) to the half-slot sidelink channel waveform hypothesis.

Clause 5. The method of any one of Clauses 1-2, further comprising selecting the full-slot sidelink channel waveform hypothesis based on the timing being within a first slot immediately prior to the initial slot and after symbol six of the first slot.

Clause 6. The method of Clause 5, further comprising mapping and rate matching a physical sidelink control channel (PSCCH) and a physical sidelink shared channel (PSSCH) to the full-slot sidelink channel waveform hypothesis.

Clause 7. The method of any one of Clauses 1-6, wherein the fixed number of resources are half-slot resources.

Clause 8. The method of Clause 7, further comprising rate matching a physical sidelink shared channel (PSSCH) to full-slot resources in each full-slot in the COT.

Clause 9. The method of Clause 7, further comprising transmitting, to the second UE, sidelink control information (SCI) indicating the TBS is based on the half-slot resources.

Clause 10. The method of any one of Clauses 1-6, wherein the fixed number of resources are full-slot resources.

Clause 11. The method of Clause 10, further comprising puncturing physical sidelink shared channel (PSSCH) resource elements in each half-slot of the COT.

Clause 12. A method for wireless communication at a first user equipment (UE), comprising: monitoring a first physical sidelink control channel (PSCCH) candidate location and a second PSCCH candidate location within each channel occupancy time (COT) slot of a group of COT slots, the first PSCCH candidate location occurring prior to the second PSCCH candidate location within each COT slot of the group of COT slots; receiving, from a second UE, a message in a first COT slot of the group of COT slots; suspending the monitoring of the second PSCCH candidate location in at least the first COT slot based on the message triggering a suspension condition; and monitoring the first PSCCH candidate location within each COT slot, of the group of COT slots, after the first COT slot based on suspending the monitoring of the second PSCCH candidate location.

Clause 13. The method of Clause 12, wherein: the message is a PSCCH demodulation reference signal (DMRS) associated with a full-slot within the first COT slot; and the suspension condition is triggered based on a reference signal received power (RSRP) associated with the PSCCH DMRS being greater than a threshold.

Clause 14. The method of Clause 12, wherein: the message is sidelink control information (SCI) 1 associated with the full-slot; and the suspension condition is triggered based on decoding the SCI-1 and a reference signal received power (RSRP) associated with the SCI-1 being greater than a threshold.

Clause 15. The method of Clause 12, wherein: the message indicates the second UE is switching to a full-slot resource pool; and the suspension condition is triggered based on the message indicating the second UE is switching.

Clause 16. The method of Clause 12, wherein: the message is sidelink control information (SCI) 2; and the suspension condition is triggered based on decoding the SCI-2 indicating the first sidelink UE is an intended receiver of the SCI-2.

Clause 17. The method of Clause 12, further comprising monitoring both the first PSCCH candidate location and the second PSCCH candidate location based on the message failing to trigger the suspension condition.

Clause 17. A UE comprising a processor, memory coupled with the processor, and instructions stored in the memory and operable, when executed by the processor to cause the UE to perform any one of Clauses 1 through 11.

Clause 18. An apparatus configured for wireless communications comprising at least one means for performing any one of Clauses 1 through 11.

Clause 19. A computer program comprising code for causing an apparatus to perform any one of Clauses 1 through 11.

Clause 20. A UE comprising a processor, memory coupled with the processor, and instructions stored in the memory and operable, when executed by the processor to cause the UE to perform any one of Clauses 12 through 16.

Clause 21. An apparatus configured for wireless communications comprising at least one means for performing any one of Clauses 12 through 16.

Clause 22. A computer program comprising code for causing an apparatus to perform any one of Clauses 12 through 16.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A first sidelink user equipment (UE), comprising:

a processing system that includes processor circuitry and memory circuitry that stores code for the processor circuitry, the processing system configured to cause the first sidelink UE to:

perform, in a shared radio frequency band, a listen-before-talk (LBT) for a channel occupancy time (COT);

select a full-slot sidelink channel waveform hypothesis associated with a first starting symbol, or a half-slot sidelink channel waveform hypothesis associated with a second starting symbol, in accordance with a timing associated with clearing the LBT; and transmit, during the COT, sidelink information to a second sidelink UE, a transport block size (TBS) associated with the COT having a fixed number of resources, the fixed number of resources being a same number of resources for full-slot sidelink channel waveform hypothesis and the half-slot sidelink channel waveform hypothesis.

2. The first sidelink UE of claim 1, wherein: the processing system is further configured to cause the first sidelink UE to prepare, prior to performing the LBT, the half-slot sidelink channel waveform hypothesis and the full-slot sidelink channel waveform hypothesis; and each of the half-slot sidelink channel waveform hypothesis and the full-slot sidelink channel waveform hypothesis corresponds to a respective physical sidelink control channel (PSCCH) waveform and a respective physical sidelink shared channel (PSSCH) waveform.

3. The first sidelink UE of claim 1, wherein the processing system is further configured to cause the first sidelink UE to select the half-slot sidelink channel waveform hypothesis based on the timing being within the initial slot and prior to the second starting symbol associated with the initial slot.

4. The first sidelink UE of claim 3, wherein the the processing system is further configured to cause the first sidelink UE to map and rate match a physical sidelink control channel (PSCCH) and a physical sidelink shared channel (PSSCH) to the half-slot sidelink channel waveform hypothesis.

5. The first sidelink UE of claim 1, wherein the processing system is further configured to cause the first sidelink UE to select the full-slot sidelink channel waveform hypothesis based on the timing being within a first slot immediately prior to the initial slot and after symbol six of the first slot.

6. The first sidelink UE of claim 5, wherein the processing system is further configured to cause the first sidelink UE to map and rate match a physical sidelink control channel (PSCCH) and a physical sidelink shared channel (PSSCH) to the full-slot sidelink channel waveform hypothesis.

7. The first sidelink UE of claim 1, wherein the fixed number of resources are half-slot resources.

8. The first sidelink UE of claim 7, wherein the processing system is further configured to cause the first sidelink UE to rate match a physical sidelink shared channel (PSSCH) to full-slot resources in each full-slot in the COT.

9. The first sidelink UE of claim 7, wherein the processing system is further configured to cause the first sidelink UE to transmit, to the second sidelink UE, sidelink control information (SCI) indicating the TBS is based on the half-slot resources.

10. The first sidelink UE of claim 1, wherein the fixed number of resources are full-slot resources.

11. The first sidelink UE of claim 10, wherein the processing system is further configured to cause the first sidelink UE to puncture physical sidelink shared channel (PSSCH) resource elements in each half-slot of the COT.

12. A method for wireless communication by a first sidelink user equipment (UE), comprising:

performing, in a shared radio frequency band, a listen-before-talk (LBT) for a channel occupancy time (COT);

selecting a full-slot sidelink channel waveform hypothesis associated with a first starting symbol, or a half-slot sidelink channel waveform hypothesis associated with a second starting symbol, in accordance with a timing associated with clearing the LBT; and transmitting, during the COT, sidelink information to a second sidelink UE, a transport block size (TBS) associated with the COT having a fixed number of resources, the fixed number of resources being a same number of resources for full-slot sidelink channel waveform hypothesis and the half-slot sidelink channel waveform hypothesis.

13. The method of claim 12, further comprising preparing, prior to performing the LBT, the half-slot sidelink channel waveform hypothesis and the full-slot sidelink channel waveform hypothesis, wherein each of the half-slot sidelink channel waveform hypothesis and the full-slot sidelink channel waveform hypothesis corresponds to a respective physical sidelink control channel (PSCCH) waveform and a respective physical sidelink shared channel (PSSCH) waveform.

14. The method of claim 12, wherein the first sidelink UE selects the half-slot sidelink channel waveform hypothesis based on the timing being within the initial slot and prior to the second starting symbol associated with the initial slot.

15. The method of claim 14, further comprising mapping and rate matching a physical sidelink control channel (PSCCH) and a physical sidelink shared channel (PSSCH) to the half-slot sidelink channel waveform hypothesis.

16. The method of claim 12, wherein the first sidelink UE selects the full-slot sidelink channel waveform hypothesis based on the timing being within a first slot immediately prior to the initial slot and after symbol six of the first slot.

17. The method of claim 16, further comprising mapping and rate matching a physical sidelink control channel (PSCCH) and a physical sidelink shared channel (PSSCH) to the full-slot sidelink channel waveform hypothesis.

18. The method of claim 12, wherein the fixed number of resources are half-slot resources.

19. The method of claim 18, further comprising rate matching a physical sidelink shared channel (PSSCH) to full-slot resources in each full-slot in the COT.

20. The method of claim 18, further comprising transmitting, to the second sidelink UE, sidelink control information (SCI) indicating the TBS is based on the half-slot resources.

21. The method of claim 12, wherein the fixed number of resources are full-slot resources.

22. The method of claim 21, further comprising puncturing physical sidelink shared channel (PSSCH) resource elements in each half-slot of the COT.

* * * * *